(No Model.)
J. M. KROENER.
METAL HUB.
No. 535,013. Patented Mar. 5, 1895.
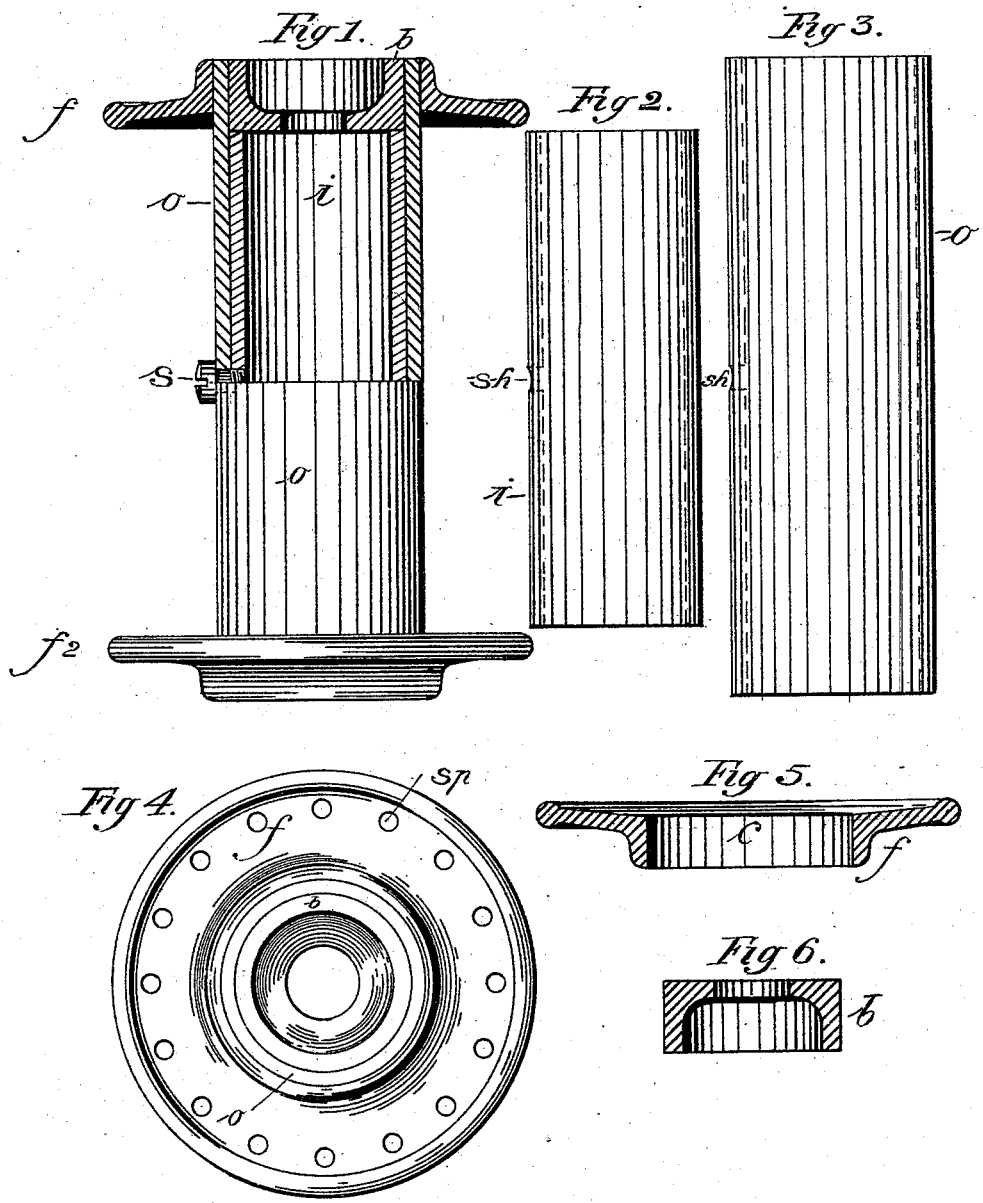
Witnesses.
H. Tillis
Val. Kunz
Inventor.
John Martin Kroener
per A. W. King
Attorney.

UNITED STATES PATENT OFFICE.

JOHN MARTIN KROENER, OF AURORA, ILLINOIS.

METAL HUB.

SPECIFICATION forming part of Letters Patent No. 535,013, dated March 5, 1895.

Application filed June 21, 1894. Serial No. 515,231. (No model.)

*To all whom it may concern:*

Be it known that I, JOHN MARTIN KROENER, a citizen of the United States, residing at Aurora, in the county of Kane and State of Illinois, have invented certain new and useful Improvements in Metal Hubs, of which the following is a specification, reference being had to the accompanying drawings, which are made part hereof, and in which—

Figure 1 is a view of the entire hub shown partly in vertical section. Figs. 2, 3, 4, 5 and 6 are detailed views of the elements wherefrom the metal hub is composed or built up.

Similar letters refer to similar parts throughout the several views.

The object of the present invention is to provide a metal hub of such a construction, that the assembling of a series of parts furnished with straight cylindrical exterior and corresponding interior surfaces, without any screwthreads or tapping, if so desired, will result in a complete hub, the various parts whereof may then be rigidly united together by brazing, soldering or any equivalent means.

The metal hub consists of the following parts: the outer tube O, Figs. 1 and 3, the inner tube $i$, Figs. 1 and 3; the two flanges $f$ and $f^2$, Figs. 1, 4, and 5, two bushings $b$, Figs. 1 and 6 and, preferably, but not necessarily as will be shown hereinafter, of a screw S, Fig. 1.

The metal hub, Fig. 1, is put together from its constituent parts in the following manner: Upon each of the extreme ends of the outer tube O, Fig. 3, are forced two similar flanges $f$, Fig. 4, with their cylindrical openings C Fig. 5. I prefer to solder or braze flanges $f$ and $f^2$ to the outer tube O, not wishing to employ any other means of uniting these parts together, as by pinning or screwing. The flanges are furnished with a number of holes $s\,p$, Fig. 4 wherein the metal spokes, customary in similar constructions, are secured. The two annular pieces $b$, Figs. 1 and 6, known in the art as bushings and destined to furnish a hard and smooth rolling surface to the bearing balls which are ordinarily employed in connection with such metal hubs, are to be inserted into the ends of tube O in such a manner as to secure them against lateral displacement by any strain which may be brought upon them when the hub is in actual service. This is accomplished by placing into the interior of tube O another tube $i$, called the inner tube, and snugly fitting the interior of tube O, said inner tube $i$ being of such a length as to bear against the flat surface of both bushings $b$ when the edge of their concave side is flush with the outer edges of flanges $f$ and $f^2$ and with the extreme ends of tube O. To secure the inner tube $i$ against displacement, I prefer to employ a screw S Fig. 1, which passes through an aperture $Sh$ of outer tube O, Fig. 3, and into a similar one $Sh$ Fig. 2 of inner tube, the aperture in the latter being tapped with a thread corresponding with same on screw S Fig. 1. Tubes O and $i$ could also be united by brazing or soldering or driving a pin into apertures $Sh$, Figs. 2 and 3, but for illustrative purposes in my drawings, I prefer to show the method of uniting tubes O and $i$ by a small screw S, Fig. 1, not confining myself to this method however.

By the above mentioned construction, I obtain a secure and accurate seat and fastening for bushings $b$ without boring, reaming or cutting a recess into ends of tube O to form a shoulder for the edge of flat surface of bushings $b$ to abut against or without forming a circular flange around face of bushings $b$ to rest upon extreme ends of tube O or of flanges $f$ and $f^2$, both of which performances I desire to avoid, being costly and often inaccurate.

I am aware that prior to my invention, ball bearing metal hubs have been made from cylindrical tubes, with separate flanges and bushings fitted thereto. I therefore do not claim such a combination broadly, but What I do claim as my invention, and desire to secure by Letters Patent, is—

1. In a metal hub, the combination of an inner and an outer piece of cylindrical tubing, a pair of flanges with plain cylindrical apertures and a pair of bushings of a plain cylindrical exterior, substantially as set forth.

2. In a metal hub, the combination of an inner and an outer piece of cylindrical tubing, a pair of flanges with plain cylindrical apertures and a pair of bushings of a plain cylindrical exterior, the flanges being secured to the outer tubing by means of brazing or soldering, substantially as described.

3. In a metal hub, the combination of an inner and an outer piece of cylindrical tubing, a pair of flanges with plain cylindrical apertures and a pair of bushings of a plain cylindrical exterior, and means for rigidly securing the outer and inner cylindrical tubes to each other, for the purpose and in the manner, substantially as set forth.

4. The combination, in a metal hub, of an inner and an outer piece of cylindrical tubing, a pair of flanges with plain cylindrical apertures and a pair of bushings of a plain cylindrical exterior, said bushings abutting against the ends of the inner tube, substantially as set forth.

5. The combination in a metal hub, of an inner and an outer piece of cylindrical tubing, a pair of flanges with plain cylindrical apertures and a pair of bushings of a plain cylindrical exterior, the inner tube with its exterior closely fitting the interior of outer tube and the ends of inner tube forming shoulders or seats for the bushings to abut against, substantially as set forth.

JOHN MARTIN KROENER.

Witnesses:
  H. TILLIS,
  VAL. KUNZ.